(12) United States Patent
Zhu et al.

(10) Patent No.: US 12,024,245 B2
(45) Date of Patent: Jul. 2, 2024

(54) SINGLE-LEG ROBOT MECHANISM FOR JUMPING ON A WALL AND METHOD FOR CONTROLLING THE SAME

(71) Applicant: ZHEJIANG UNIVERSITY, Hangzhou (CN)

(72) Inventors: Qiuguo Zhu, Hangzhou (CN); Yidong Zhao, Hangzhou (CN); Jun Wu, Hangzhou (CN); Rong Xiong, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 240 days.

(21) Appl. No.: 16/965,001

(22) PCT Filed: Oct. 11, 2019

(86) PCT No.: PCT/CN2019/110519
§ 371 (c)(1),
(2) Date: Jul. 26, 2020

(87) PCT Pub. No.: WO2020/173098
PCT Pub. Date: Sep. 3, 2020

(65) Prior Publication Data
US 2021/0380186 A1 Dec. 9, 2021

(30) Foreign Application Priority Data

Feb. 26, 2019 (CN) .......................... 201910143144.5

(51) Int. Cl.
*B62D 57/024* (2006.01)
*B64C 39/02* (2023.01)
(Continued)

(52) U.S. Cl.
CPC .......... *B62D 57/024* (2013.01); *B64C 39/024* (2013.01); *B64U 30/20* (2023.01); *B64U 50/14* (2023.01); *B64U 2101/00* (2023.01)

(58) Field of Classification Search
CPC .... B62D 57/02; B62D 57/024; B62D 57/032; B62D 57/04; B64C 39/024
(Continued)

(56) References Cited

U.S. PATENT DOCUMENTS

| 6,377,014 | B1 * | 4/2002 | Gomi | ................... | B62D 57/032 |
|---|---|---|---|---|---|
| | | | | | 318/568.22 |
| 7,775,305 | B1 * | 8/2010 | Fischer | ................... | B62D 57/00 |
| | | | | | 123/46 R |

(Continued)

FOREIGN PATENT DOCUMENTS

| CN | 2312160 Y | 3/1999 |
|---|---|---|
| CN | 101491898 A | 7/2009 |

(Continued)

OTHER PUBLICATIONS

International Search Report (PCT /CN2019/110519); Date of Mailing: Jan. 15, 2020.
FirstOfficeAction2020-528273 [Aug. 23, 2021].

*Primary Examiner* — Anne Marie M Boehler
(74) *Attorney, Agent, or Firm* — W&G Law Group (57) ABSTRACT

The disclosure discloses a single-leg robot mechanism for jumping on a wall and a control method. The mechanism includes a robot leg. A plurality of rotors is fixedly connected to a fuselage of the robot leg and is distributed in a mirror image arrangement with respect to the fuselage, and operating surfaces of the plurality of rotors are parallel to each other.

2 Claims, 6 Drawing Sheets

(51) Int. Cl.
*B64U 30/20* (2023.01)
*B64U 50/14* (2023.01)
*B64U 101/00* (2023.01)

(58) Field of Classification Search
USPC ............ 180/7.4, 8.2, 8.5, 8.6; 446/308, 317
See application file for complete search history.

(56) References Cited

U.S. PATENT DOCUMENTS

| | | | |
|---|---|---|---|
| 8,205,694 | B2 | 6/2012 | Skaff et al. |
| 9,592,908 | B2 * | 3/2017 | Gentry .................... B64C 25/18 |
| 9,623,556 | B1 * | 4/2017 | Urata ................... B62D 57/032 |
| 2002/0060267 | A1 * | 5/2002 | Yavnai ................... B62D 57/04 |
| | | | 180/7.4 |
| 2005/0194194 | A1 * | 9/2005 | Delson ................... B62D 57/02 |
| | | | 180/8.6 |
| 2019/0118385 | A1 * | 4/2019 | Xiong ...................... B25J 17/00 |
| 2019/0202560 | A1 * | 7/2019 | Bosworth ................ B64D 1/00 |
| 2020/0142052 | A1 * | 5/2020 | Liu .......................... G01S 13/89 |
| 2021/0070438 | A1 * | 3/2021 | Hoshide ................... B25J 9/161 |
| 2021/0338032 | A1 * | 11/2021 | Vezina ................ B25J 11/0085 |

FOREIGN PATENT DOCUMENTS

| | | |
|---|---|---|
| CN | 201784421 U | 4/2011 |
| CN | 102815349 A | 12/2012 |
| CN | 103264733 A | 8/2013 |
| CN | 103879470 A | 6/2014 |
| CN | 106184453 A | 12/2016 |
| CN | 109850025 A | 6/2019 |
| ES | 2209617 A1 | 6/2004 |
| JP | 2008178953 A | 8/2008 |

* cited by examiner

SINGLE-LEG ROBOT MECHANISM FOR JUMPING ON A WALL AND METHOD FOR CONTROLLING THE SAME

TECHNICAL FIELD

The present disclosure relates to the field of a robot, in particular to a single-leg robot mechanism for jumping on a wall and a method for controlling the same.

BACKGROUND

With the development of the science and technology, a robot age is coming. The Leg-foot robot is one of the main research hotspots in the field of the robot. How to achieve the fast running and jumping of leg-foot robots has become a research focus in the field of the robot. The movements such as walking and jumping that can be achieved by the human legs have an important reference significance for improving the movement performance of the leg-foot robot. At present, the research on the leg-foot robot in the world mainly focuses on the functions of walking, running and jumping, and crawling and the like on the plane, while there has not been any in-depth research on the leg-foot robot climbing over an obstacle such as a vertical wall. However, this robot has an important application value in some special occasions.

A single-leg robot is the simplest robot in the legged robot, and has the advantages of simple dynamic models, less interference, low research cost and short period. By designing a single-leg robot mechanism, the structural characteristics and movement characteristics of the legged robot can be better understood.

For example, a single-leg robot jumping mechanism with an active ankle joint and a bionic foot disclosed in a patent literature whose patent number is CN106005079A solves the problems in the prior art that the energy storage ability of the robot in jumping is weak, the cooperative operation of hip and knee cannot be achieved, and the ankle joint cannot be protected from the impact in jumping. However, this single-leg robot does not have the function of adjusting the trajectory of the center of mass in the air, therefore it is difficult to maintain the balance of the movement, and it is also difficult to achieve the function of climbing over an obstacle on the complex ground.

For example, a link-driven single-leg robot jumping mechanism disclosed in a patent literature whose patent number is CN103879470B achieves a direction control since the direction driving device can drive the thigh to rotate. The jumping driving device and the direction driving device are close to the fuselage, which reduces the rotational inertia of the thigh relative to the fuselage and can reduce the energy consumption of the first driving motor and improves the stability and agility of the robot movement. By balancing the flywheels, the stability of the robot is increased, and by providing the elastic energy storage member and the balance member, both energy storage and buffering are achieved. However, this robot does not have an ankle joint and a sole, and thus cannot use the movement of the ankle joint to improve the jumping ability of the robot, and in a high-intensity jumping movement, the ability to relax the impact of the ground on the knee and hip joints of the robot is also relatively limited.

In a technical solution of a jumping robot with extremely strong power disclosed in a paper of "Fearing. Robotic vertical jumping agility via series-elastic power modulation", a hinge and eight levers are additionally incorporated in the leg design, and when the motor applies torque to one of the eight levers, other levers will also rotate, at this time, the leg will generate a lot of energy and generates a thrust downward, so that the machine can better jump. Although this robot achieves the continuous jumping actions of jumping from the ground to the wall and then jumping away from the wall again, it essentially still belongs to the technical solution of a ricochet robot which relies on the ground to generate force, does not have the ability to continuously jump on the vertical wall, and cannot jump over higher obstacles.

A paper of "Precision jumping limits from flight-phase control in Salto-1P" discloses a technical solution of a single-leg robot with propeller control, the propeller can control the course and the roll of the robot in the air, and in combination with the original pitching up and under control ability of the rotational inertia tail in the vertical direction, the technical solution achieves the function of adjusting postures in the air. However, the propeller power of this robot is small, the acceleration of the center of mass of the fuselage applied by the propeller in the suspension state is small, the greater impact due to contacting the ground in jumping cannot be effectively controlled in the air, thus the continuously jumping of the robot on the wall cannot be achieved.

SUMMARY

In view of the above problems, the present disclosure provides a single-leg robot mechanism for jumping on a wall and a method for controlling the same, which achieve a function of balancing the movement of the single-leg robot in a complex environment, and make the single-leg robot mechanism has an athletic ability of jumping on the wall.

In order to achieve the above objects, the present disclosure adopts the following technical solution. A single-leg robot mechanism for jumping on a wall is provided and includes a robot leg. A plurality of rotors is fixedly connected to a fuselage of the robot leg, and is distributed in a mirror image arrangement with respect to the fuselage, and operating surfaces of the plurality of rotors are parallel to each other.

Further, a controller and a gyroscope are installed inside the fuselage, and the gyroscope and the plurality of rotors are all connected to the controller.

Further, a gyroscope configured to detect postures of the fuselage of the robot is installed inside the fuselage and connected to the controller.

Further, the plurality of rotors comprises four rotors, and the four rotors are an upper left rotor, an upper right rotor, a lower left rotor, and a lower right rotor.

Further, the robot leg includes the fuselage, a thigh, a calf and a foot that are sequentially articulated, a hip joint configured to drive the thigh to rotate is provided at a location where the fuselage and the thigh are articulated, and a knee joint configured to drive the calf to rotate is provided on the thigh, an ankle joint configured to drive the foot to rotate is provided on the calf, and the hip joint, the knee joint, and the ankle joint are all connected to the controller.

Further, a material with a friction factor greater than 0.5 is installed at a bottom of the foot.

Another object of the present disclosure is to provide a method for controlling the single-leg robot mechanism for jumping on a wall. The method is divided into three processes of a force generation phase, a suspension phase, and a contraction phase.

During jumping on the wall, the force generation phase is a phase in which the foot of the single-leg robot mechanism steps on the wall and the hip joint, the knee joint, and ankle joint operate actively. In the force generation phase, the single-leg robot mechanism provides a thrust upward and in a direction facing away from the wall by applying a pressure on the wall and by means of friction between the foot and the wall, and in the force generation phase, the plurality of rotors are operated to provide torque on the fuselage by different speeds of upper and lower rotors, in such a manner that a disturbance torque applied on the fuselage due to the stepping of the foot is balanced and thus balance of the fuselage are maintained. In the force generation phase, the gyroscope installed in the fuselage of the single-leg robot mechanism is configured to monitor posture and speed information of the single-leg robot mechanism, and thus the balance of the fuselage is maintained by adjusting the stepping of the foot on the wall and rotation speeds of the plurality of rotors. When the foot leaves the wall, the suspension phase starts.

The suspension phase is a phase in which the foot of the single-leg robot mechanism does not contact the wall and an entirety of the single-leg robot mechanism is in suspension. In the suspension phase, based on a posture of the fuselage of the single-leg robot mechanism fed back by the gyroscope, the upper left rotor, the upper right rotor, the lower left rotor, and the lower right rotor cooperate to apply a thrust towards wall to the single-leg, robot mechanism, in such a manner that a center of mass obtains acceleration toward the wall. If the robot fuselage leans forward, the lower left rotor and the lower right rotor rotate faster, and the upper left rotor and the upper right rotor rotate slower, providing the robot with a pitching up torque. If the robot leans backward, the upper left rotor and the upper right rotor rotate faster, and the lower left rotor and the lower right rotor rotate slower, providing the robot with a pitching down torque, thereby ensuring the posture of the robot in the suspension phase stable. At the same time, the hip joint, the knee joint, and the ankle joint of the robot cooperatively move, which, on the one hand, needs to overcome an influence of a gravity torque, and on the other hand, needs to select an appropriate foothold position based on a vertical speed When the foot starts to contact the wall, the contraction phase starts.

The contraction phase is a phase in which the hip joint, the knee joint, and the ankle joint are passively contracted after contacting the wall and the center of mass of the single-leg robot mechanism decelerates in a horizontal direction after the foot of the single-leg robot mechanism contacts the wall again. In the contraction phase, after the foot contacts the wall. based on the posture of the fuselage of the single-leg robot mechanism fed back by data of the gyroscope, speeds of the upper left rotor, the upper right rotor, the lower left rotor, and the lower right rotor are adjusted to balance torque applied on the center of mass of the single-leg robot mechanism caused by an impact of the wall on the foot, and to maintain the balance of the fuselage until the leg is compressed to a set limit, and then the force generation phase starts. The force generation phase, the suspension phase, and the contraction phase are circulated, achieving a function of continuously jumping of the single-leg robot mechanism on the wall.

Compared with the background technology, the present disclosure has the following beneficial effects. The present disclosure is additionally provided with a rotor mechanism, which can actively control the trajectory of the center of mass and the postures of the fuselage of the robot in the air. In combination with the control method disclosed in the present disclosure, the technical effect of continuously jumping on the vertical wall can be achieved, which improves the application occasions and athletic ability of the robot.

In the drawings: 1. fuselage, 2. hip joint, 3. thigh, 4. knee join, 5. calf, 6. ankle joint, 7. foot, 8. upper left rotor, 9. right upper rotor, 10. lower left rotor, and 11. lower right rotor.

DESCRIPTION OF EMBODIMENTS

The present disclosure will be further described below with reference to the drawings and examples.

Figure 1:
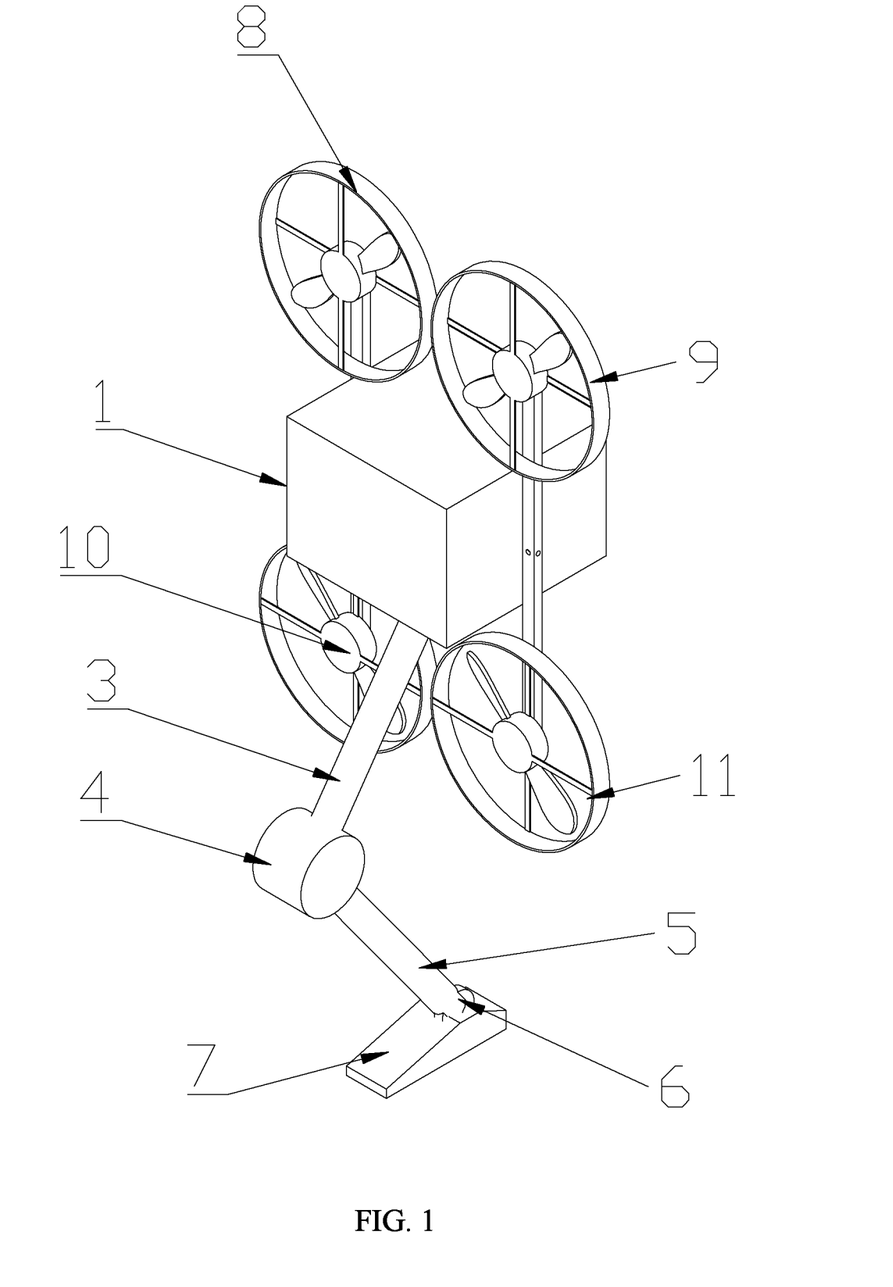
FIG. 1 is a perspective view of a single-leg robot mechanism for jumping on a wall according to the present disclosure.
Figure 2:
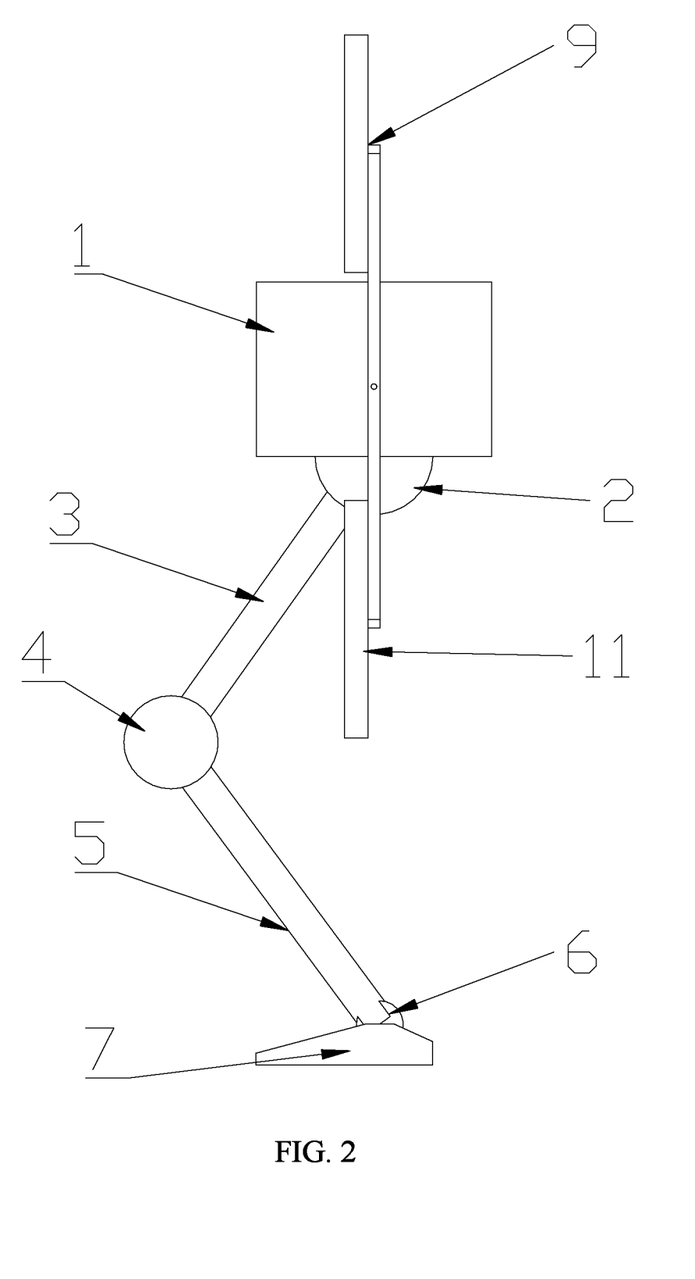
FIG. 2 is a side view of a single-leg robot mechanism for jumping on a wall according to the present disclosure.

As shown in FIG. 1 and FIG. 2, a single-leg robot mechanism for jumping on a wall includes a robot leg. A plurality of rotors is fixedly connected to a fuselage of the robot leg and is distributed in a mirror image arrangement with respect to the fuselage, and operating surfaces of the plurality of rotors are parallel to each other.

A controller and a gyroscope are installed inside the fuselage 1, and the gyroscope and the plurality of rotors are all connected to the controller.

In this embodiment, the number of the plurality of rotors is four, namely an upper left rotor 8, an upper right rotor 9, a lower left rotor 10, and a lower right rotor 11. The rotors can be, but are not limited to rotors of an unmanned aerial vehicle.

Further, the robot leg includes a fuselage 1, a thigh 3, a calf 5 and a foot 7 which are sequentially articulated. A hip joint 2 configured to drive the thigh to rotate is provided at the location where the fuselage 1 and the thigh 3 are articulated, the a knee joint 4 configured to drive the calf 5 to rotate is provided on the thigh 3, an ankle joint 6 configured to drive the foot 7 to rotate is provided on the calf 5, and the hip joint 2, the knee joint 4 and the ankle joint 6 are all connected to the controller. The technical solution of the robot leg according to the present disclosure can adopt, but is not limited to the technical contents disclosed in a patent literature whose patent number is CN106005079A.

Further, a material with a large friction factor, such as rubber, is installed at the bottom of the foot, and the friction factor of such material is greater than 0.5.

The operating process of the present disclosure is shown in FIG. 3 to FIG. 6, and is divided into three processes of a force generation phase, a suspension phase, and a contraction phase, which are described as follows.

Figure 3:
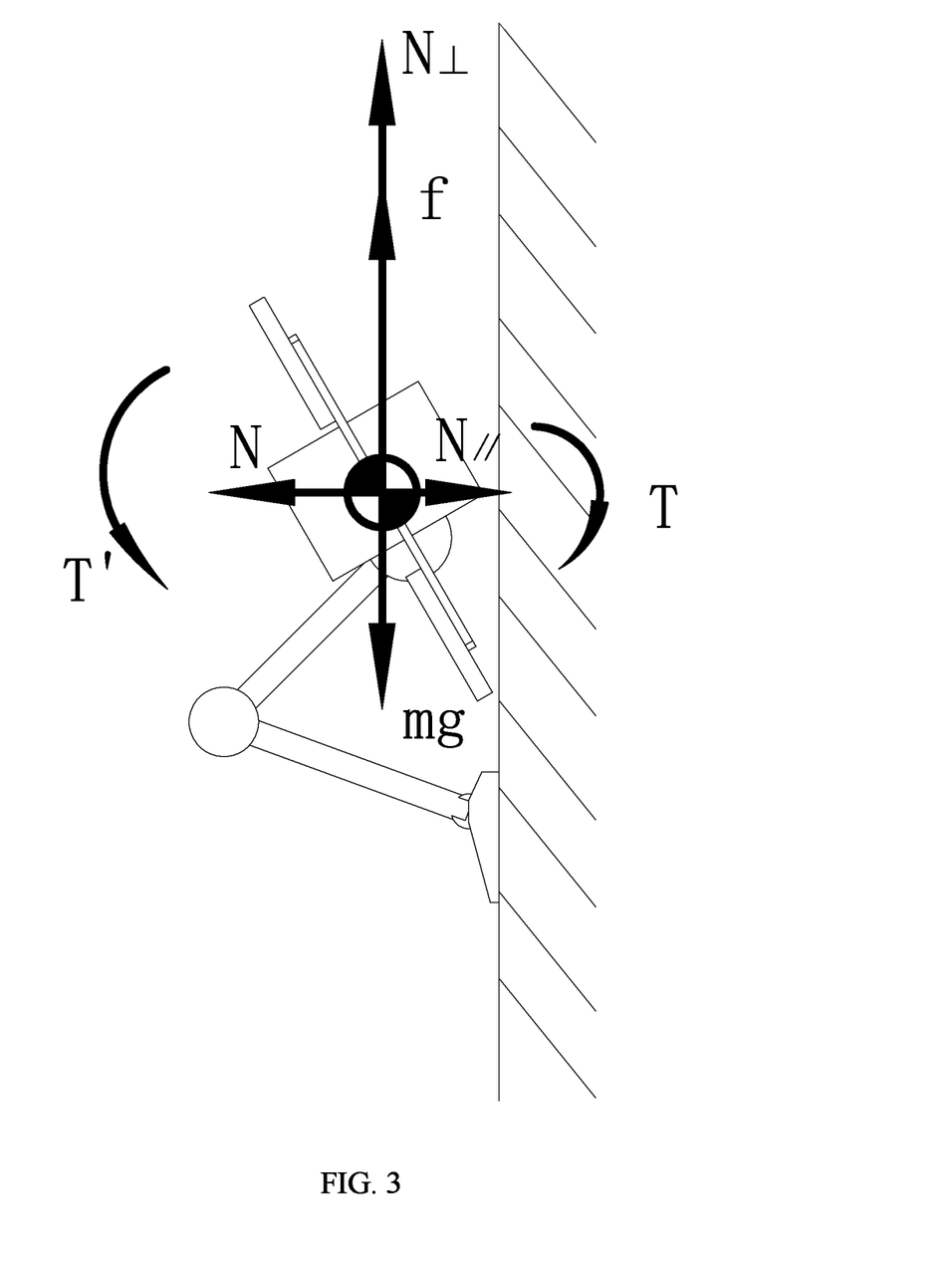
FIG. 3 is a schematic diagram of a dynamic model of a single-leg robot mechanism for jumping on a wall in a force generation phase when jumping on the wall according to the present disclosure.

FIG. 3 shows a posture and a force condition of the robot in the force generation phase The force generation phase is a phase in which the foot 7 of the single-leg robot mechanism steps on the wall and the hip joint 2, the knee joint 4 and the ankle joint 6 actively operate. In the force generation phase, the single-leg robot mechanism provides the robot with a thrust upward and in a direction facing away from the wall by applying a pressure on the wall and by means of friction between the foot 7 and the wall. The rotors in this phase are mainly operated to balance torque due to the stepping of the foot 7.

As shown in FIG. 3, dynamic equations in the force generation phase are listed as follows:

in a horizontal direction:

$$N - N_{\parallel} = m a_{\parallel},$$

in a vertical direction:

$$f + N_{\perp} - m g = m a_{\perp},$$

torque:

$$T - T' = I \cdot \beta,$$

where N denotes a horizontal force applied on the center of mass of the robot when the leg steps on the wall, $N_{\parallel}$ denotes a horizontal force applied on the center of mass of the single-leg robot generated by the operating of the rotors, m denotes mass of the robot, $a_{\parallel}$ denotes acceleration of the single-leg robot mechanism in the horizontal direction; f denotes friction applied on the center of mass of the single-leg robot mechanism when the leg steps on the wall, $N_{\perp}$ denotes a vertical force applied on the center of mass of the single-leg robot mechanism generated by the operating of the rotors, g denotes acceleration of gravity, $a_{\perp}$ denotes acceleration of the robot in the vertical direction; T denotes torque of the single-leg robot generated by the stepping of foot on the wall, T' denotes torque generated when the rotors operate, I denotes a rotational inertia of the robot, and $\beta$ denotes an angular acceleration of the single-leg robot mechanism.

In the force generation phase, the gyroscope installed in the fuselage 1 needs to read pitch angles of the fuselage and values of $a_{\parallel}$ and $a_{\perp}$ in real time, and then magnitudes of $N_{\parallel}$, $N_{\perp}$ and T' are adjusted by adjusting the stepping of the foot 7 on the wall and the rotation speeds of the rotors, enabling the center of mass of the single-leg robot mechanism to obtain a greater vertical acceleration $a_{\perp}$ and a smaller horizontal acceleration $a_{\parallel}$, and maintaining balance of the torque of the fuselage of the single-leg robot mechanism. When the thigh 3 and the calf 5 are kept in a straight line, the fuselage 1 continues to move upward and outward, the foot 7 will leave the wall, and a sensor in the foot 7 cannot detect information about contacting the wall, at this time the suspension phase starts.

Figure 4:
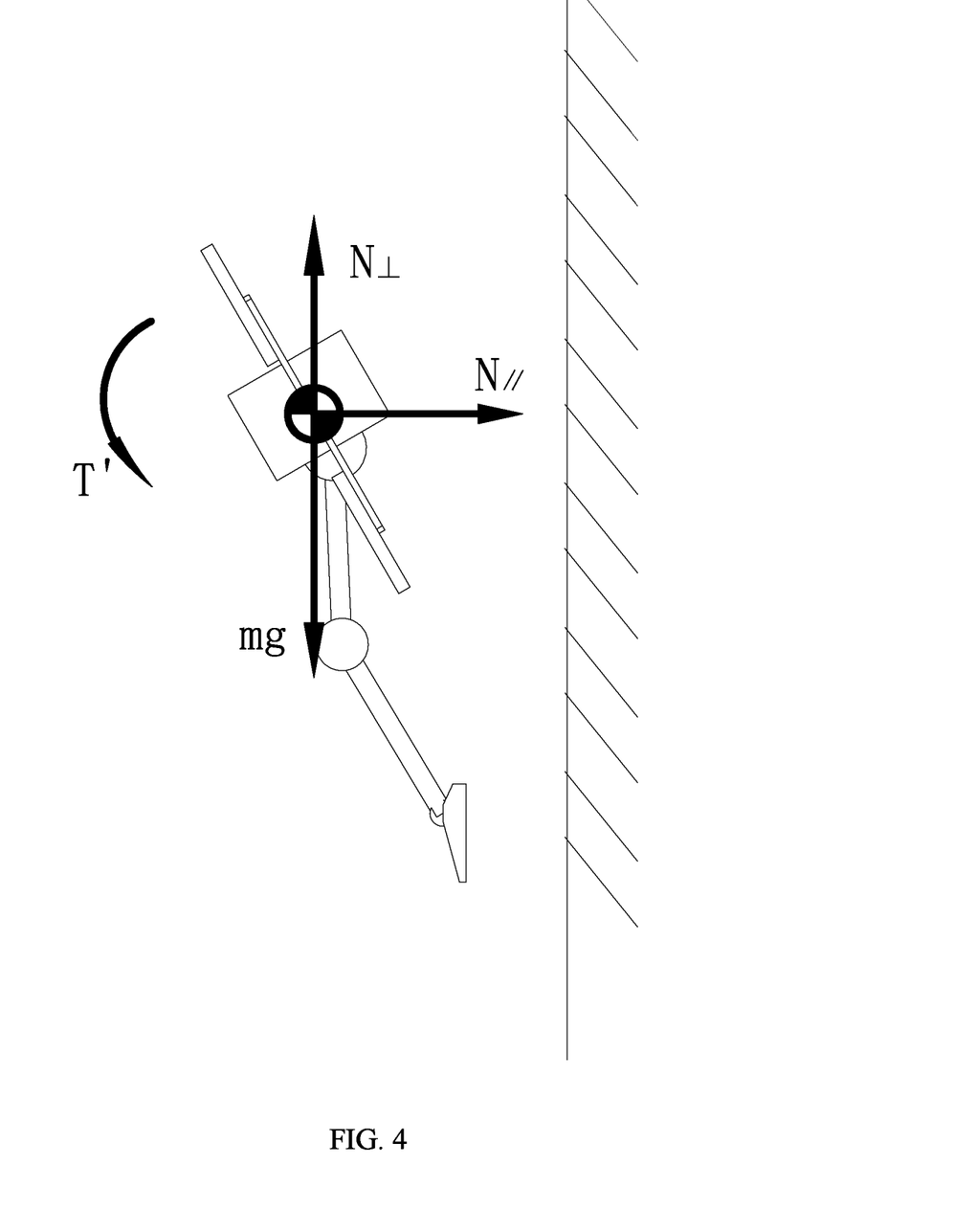
FIG. 4 is a schematic diagram of a dynamic model of a single-leg robot mechanism for jumping on a wall in a suspension phase when jumping on the wall according to the present disclosure.

FIG. 4 shows a posture and force condition of the single-leg robot mechanism in the suspension phase. The suspension phase is a phase in which the foot 7 does not contact the wall and the whole robot is in suspension. During the suspension phase, based on postures of the fuselage of the single-leg robot mechanism that are fed back by the gyroscope, the upper left rotor 8, the upper right rotor 9, the lower left rotor 10, and the lower right rotor 11 cooperate to apply a thrust toward the wall to the robot and balance the posture of the fuselage. If the fuselage 1 leans forward, the lower left rotor 10 and the lower right rotor 11 rotate faster, and the upper left rotor 8 and the upper right rotor 9 rotate slower, providing the single-leg robot with a pitching up torque. If the fuselage 1 leans backward, the upper left rotor 8 and the upper right rotor 9 rotate faster, and the lower left rotor 10 and the lower right rotor 11 rotate slower, providing the single-leg robot with a pitching down torque.

As shown in FIG. 4, dynamic equations in the suspension phase are listed as follows:

in the horizontal directions:

$$N_{\parallel} = m a_{\parallel},$$

in the vertical direction:

$$N_{\perp} - m g = m a_{\perp},$$

torque:

$$T' = I \cdot \beta.$$

In the suspension phase, the gyroscope installed in the fuselage 1 needs to read the pitching up and pitching down angles of the fuselage and values of $a_{\parallel}$ and $a_{\perp}$ in real time, and then the magnitude of T' is adjusted by adjusting the rotation speeds of the rotors, enabling the center of mass of the single-leg robot mechanism to obtain a greater horizontal acceleration $a_{\parallel}$ toward the wall, and maintaining the balance of the torque of the fuselage of the single-leg robot mechanism. In the suspension phase, the hip joint 2, the knee joint 4 and the ankle joint 6 cooperatively move, which, on the one hand, needs to overcome the influence of a gravity torque, and on the other hand, needs to select an appropriate foothold position based on the vertical speed. When a thrust toward the wall applied cooperatively by the upper left rotor 8, the upper right rotor 9, the lower left rotor 10, and the lower right rotor 11 enables the single-leg robot mechanism to move toward the wall, the foot 7 starts to contact the wall and then the contraction phase starts.

Figure 5:
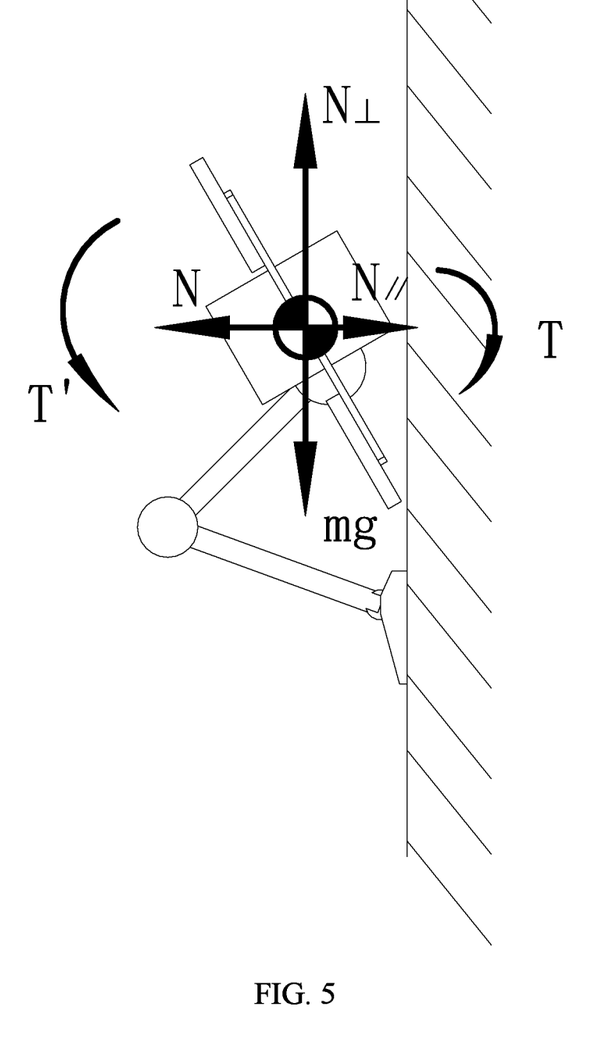
FIG. 5 is a schematic diagram of a dynamic model of a single-leg robot mechanism for jumping on a wall in a contraction phase when jumping on the wall according to the present disclosure.
Figure 6:
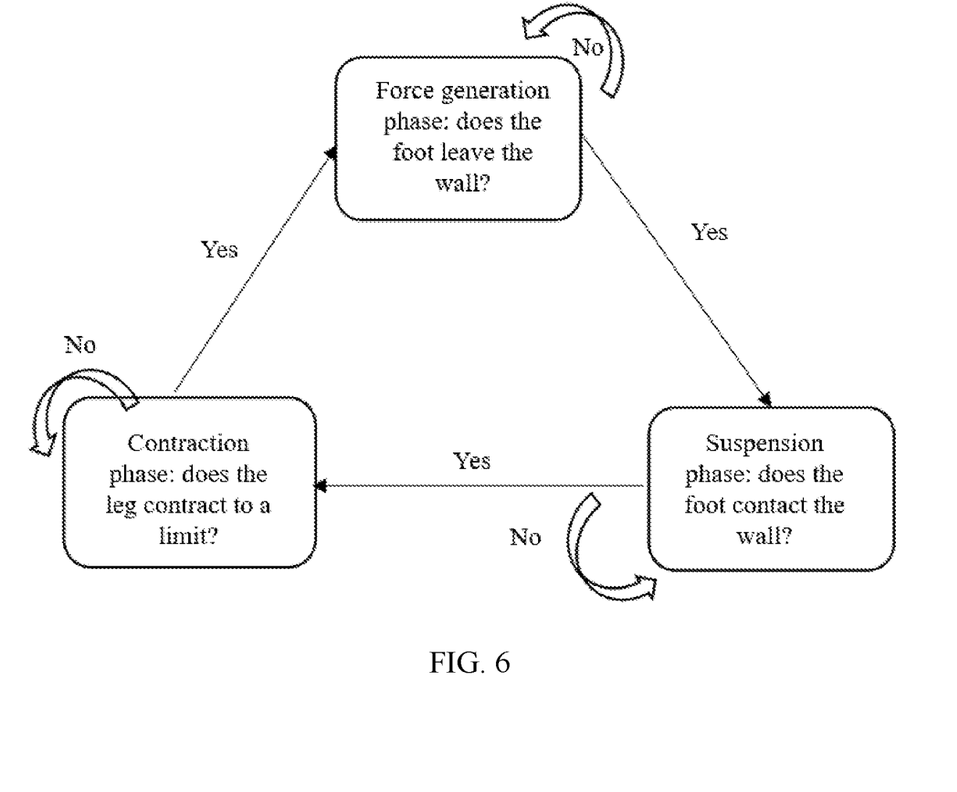
FIG. 6 is a block diagram of an algorithm control of the single-leg robot for jumping on a wall according to the present disclosure.

FIG. 5 shows a posture and force condition of the single-leg robot mechanism in the contraction phase. The contraction phase is a phase in which the hip joint 2, the knee joint 4 and the ankle joint 6 contract in a state of zero torque after the foot 7 contacts the wall again. During the contraction phase, after the foot 7 contacts the wall, based on the posture of the fuselage of the single-leg robot mechanism that is fed back based on the data from the gyroscope, the upper left rotor 8, speeds of the upper right rotor 9, the lower left rotor 10, and the lower right rotor 11 are adjusted to balance torque applied on the center of mass of the single-leg robot mechanism due to the impact of the wall on the foot 7, maintaining the balance of the fuselage 1.

As shown in FIG. 5, dynamic equations in the contraction phase are listed as follows:

in the horizontal direction:

$$N - N_{\parallel} = m a_{\parallel},$$

in the vertical direction:

$$N_{\perp} - m g = m a_{\perp},$$

torque:

$$T' - T' = I \cdot \beta.$$

In the contraction phase, the robot maintains the balance of the posture of the fuselage of the single-leg robot mechanism through the operation of the rotors, the dynamic equations in the contraction phase are similar to those in the force generation phase, and there is a main difference therebetween, which is that the hip joint 2, the knee joint 4 and the ankle joint 6 are driven to move passively in the contraction phase until the leg is compressed to a set limit and then the force generation phase starts. And the force generation phase, the suspension phase, and the contraction phase circulate, thus achieving the function of jumping on the vertical wall.

What is claimed is:

1. A single-leg robot mechanism for jumping on a wall, comprising:

a robot leg, wherein the robot leg comprises a fuselage, a thigh, a calf and a foot that are sequentially articulated, wherein a plurality of rotors is fixedly connected to the fuselage of the robot leg and is distributed in a mirror image arrangement with respect to the fuselage, and operating surfaces of the plurality of rotors are parallel to each other, and the plurality of rotors are configured to actively control a trajectory of a center of mass and postures of the fuselage of the robot mechanism in the air;

wherein the plurality of rotors comprises four rotors, and the four rotors are an upper left rotor, an upper right rotor, a lower left rotor, and a lower right rotor;

wherein a hip joint configured to drive the thigh to rotate is provided at a location where the fuselage and the thigh are articulated, a knee joint configured to drive the calf to rotate is provided on the thigh, an ankle joint configured to drive the foot to rotate is provided on the calf, and the hip joint, the knee joint, and the ankle joint are all connected to a controller;

wherein a rubber is installed at a bottom of the foot, and;

wherein the controller is configured to control the single-leg robot mechanism by a method, and the method comprises a force generation phase, a suspension phase, and a contraction phase;

wherein in a process of jumping on the wall, the force generation phase is a phase in which the foot steps on the wall and the hip joint, the knee joint and the ankle joint operate actively; wherein in the force generation phase, the single-leg robot mechanism provides itself with a thrust upward and in a direction facing away from the wall by applying a pressure to the wall and by means of friction between the foot and the wall, and in the force generation phase, torque applied on the fuselage is provided by different rotation speeds of upper and lower rotors, in such a manner that a disturbance torque applied on the fuselage due to the stepping of the foot is balanced and thus balance of the fuselage is maintained; and wherein in the force generation phase, a gyroscope installed in the fuselage is configured to monitor posture and speed information of the single-leg robot mechanism, and then the balance of the fuselage is maintained by adjusting the stepping of the foot on the wall and rotation speeds of the plurality of rotors;

wherein the suspension phase is a phase in which the foot of the single-leg robot mechanism does not contact the wall and an entirety of the single-leg robot mechanism is in suspension; wherein in the suspension phase, based on a posture of the fuselage fed back by the gyroscope, and the upper left rotor, the upper right rotor, the lower left rotor, and the lower right rotor cooperate to apply a thrust towards the wall to the single-leg robot mechanism, in such a manner that a center of mass obtains acceleration towards the wall; wherein at the same time, the hip joint, the knee joint, and the ankle joint move cooperatively, which, on the one hand, overcome an influence of a gravity torque, and on the other hand, to select an appropriate foothold position based on a vertical speed;

wherein the contraction phase is a phase in which the hip joint, the knee joint and the ankle joint are passively contracted after contacting the wall and the center of mass of the single-leg robot mechanism decelerates in a horizontal direction after the foot contacts the wall again; wherein in the contraction phase, after the foot contacts the wall, based on the posture of the fuselage of the single-leg robot mechanism fed back by data of the gyroscope, speeds of the upper left rotor, the upper right rotor, the lower left rotor, and the lower right rotor are adjusted to balance torque applied on the center of mass of the single-leg robot mechanism caused by an impact of the wall on the foot and to maintain the balance of the fuselage until the leg is compressed to a set limit, and then the force generation phase starts; and wherein the force generation phase, the suspension phase, and the contraction phase circulate, in such a manner that continuously jumping of the single-leg robot mechanism on the wall is achieved.

2. The single-leg robot mechanism for jumping on the wall according to claim 1, wherein the controller is installed inside the fuselage, and the gyroscope and the plurality of rotors are all connected to the controller.

* * * * *